: US 10,745,876 B2
(45) Date of Patent: Aug. 18, 2020

(12) United States Patent
Ji et al.

(54) QUICKLY-DETACHABLE AIRBAG-TYPE FLOATING BREAKWATER

(71) Applicant: JIANGSU UNIVERSITY OF SCIENCE AND TECHNOLOGY, Jiangsu (CN)

(72) Inventors: Chunyan Ji, Jiangsu (CN); Jie Cui, Jiangsu (CN); Zichao Li, Jiangsu (CN); Jianting Guo, Jiangsu (CN); Fali Huo, Jiangsu (CN); Taoran Zhou, Jiangsu (CN); Hui Liu, Jiangsu (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 16/219,885

(22) Filed: Dec. 13, 2018

(65) Prior Publication Data

US 2020/0018033 A1 Jan. 16, 2020

(30) Foreign Application Priority Data

Jul. 16, 2018 (CN) .......................... 2018 1 0776832

(51) Int. Cl.
*E02B 3/06* (2006.01)
*E02B 3/16* (2006.01)
(52) U.S. Cl.
CPC ................ *E02B 3/062* (2013.01); *E02B 3/16* (2013.01)
(58) Field of Classification Search
CPC .................. E02B 3/062; E02B 3/16

USPC ..................... 405/15–35; 441/1–54
See application file for complete search history.

(56) References Cited

U.S. PATENT DOCUMENTS

| | | | | |
|---|---|---|---|---|
| 436,644 | A | * | 9/1890 | White .................... E02B 3/062 405/27 |
| 1,264,756 | A | * | 4/1918 | Begg .................. B01F 3/04262 405/22 |
| 1,846,278 | A | * | 2/1932 | Roane .................... E02B 3/062 405/27 |
| 3,237,414 | A | * | 3/1966 | Straub .................... E02B 3/062 405/26 |
| 3,276,209 | A | * | 10/1966 | Mosdell ................. E02B 3/064 405/27 |
| 3,353,361 | A | * | 11/1967 | Lloyd .................... E02B 3/062 405/28 |
| 3,357,192 | A | * | 12/1967 | Hibarger ................ E02B 3/062 405/27 |

(Continued)

*Primary Examiner* — Benjamin F Fiorello
*Assistant Examiner* — Edwin J Toledo-Duran
(74) *Attorney, Agent, or Firm* — JCIP Global Inc.

(57) ABSTRACT

The present invention discloses a quickly-detachable airbag-type floating breakwater, including a plurality of water wave absorbing structure units arranged along a length direction of the breakwater. The adjacent water wave absorbing structure units are connected by a connecting unit. The water wave absorbing structure unit comprises at least two floats arranged side by side and a wave absorbing plate located between the floats. The water wave absorbing structure unit comprises at least two floats arranged side by side and a wave absorbing plate located on the floats. The connecting unit comprises bases located at the ends of the floats, an airbag located between the adjacent bases, and a steel chain, the adjacent bases wrapping the airbag to form a buffer connecting structure.

8 Claims, 11 Drawing Sheets

(56) References Cited

U.S. PATENT DOCUMENTS

| | | | | |
|---|---|---|---|---|
| 3,461,781 A * | 8/1969 | Weiner | E04B 1/6812 | 404/48 |
| 3,631,984 A * | 1/1972 | Rath | E02B 15/06 | 210/776 |
| 3,691,774 A * | 9/1972 | Hard | E02B 3/062 | 405/26 |
| 3,864,920 A * | 2/1975 | Tazaki | E02B 3/062 | 405/27 |
| 3,884,042 A * | 5/1975 | Anderson | E02B 3/062 | 405/27 |
| 3,991,576 A * | 11/1976 | Tazaki | E02B 3/062 | 405/21 |
| 4,023,370 A * | 5/1977 | Watson | E02B 3/062 | 405/26 |
| 4,027,486 A * | 6/1977 | Dougherty | E02B 3/062 | 405/27 |
| 4,070,980 A * | 1/1978 | Shorter, Jr. | B63B 35/38 | 114/263 |
| 4,234,266 A * | 11/1980 | Angioletti | E02B 3/062 | 405/26 |
| 4,365,914 A * | 12/1982 | Sluys | E02B 3/064 | 114/267 |
| 5,483,913 A * | 1/1996 | Ohkawa | B63B 21/50 | 114/264 |
| 5,740,753 A * | 4/1998 | Theophanis | B63B 5/14 | 114/267 |
| 6,102,616 A * | 8/2000 | Foote | E02B 3/062 | 405/26 |
| 9,556,573 B2 * | 1/2017 | Betcher | E02B 3/062 | |
| 2007/0283866 A1* | 12/2007 | Veazey | B63C 1/04 | 114/77 R |
| 2010/0282155 A1* | 11/2010 | Mattson | B63B 35/34 | 114/266 |
| 2013/0170909 A1* | 7/2013 | Osby | E02B 7/02 | 405/26 |
| 2015/0111446 A1* | 4/2015 | Nordberg | B60F 3/0038 | 440/12.5 |
| 2015/0330046 A1* | 11/2015 | Betcher | E02B 3/062 | 405/26 |

* cited by examiner

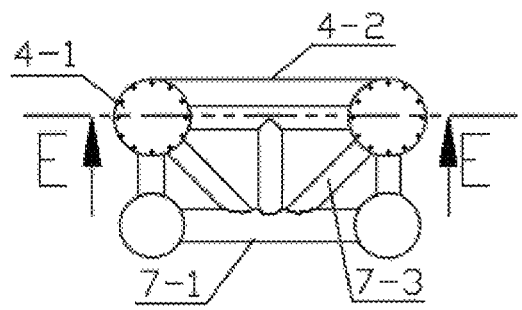
Fig.5-2 (a)
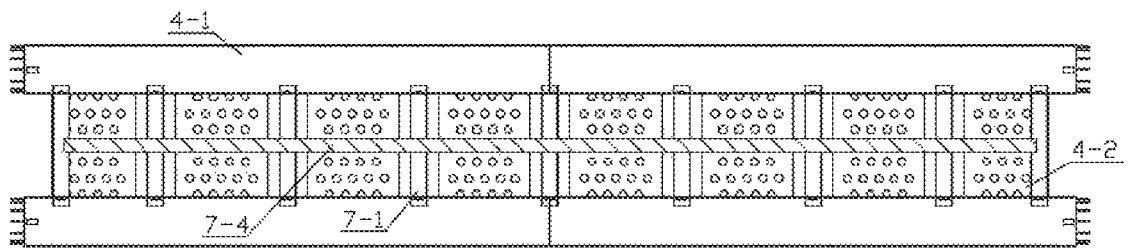
Fig.5-2 (b)
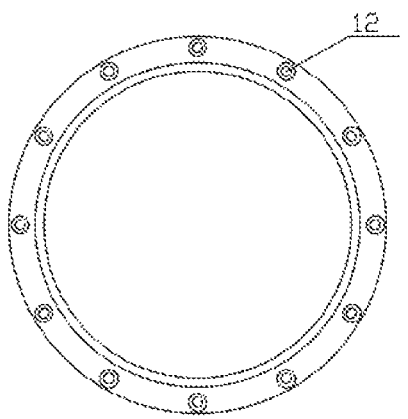 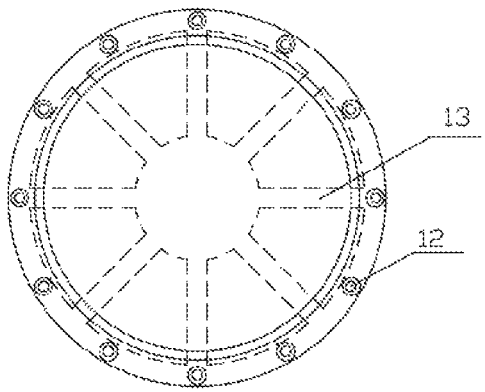
Fig.6-1                        Fig.6-2

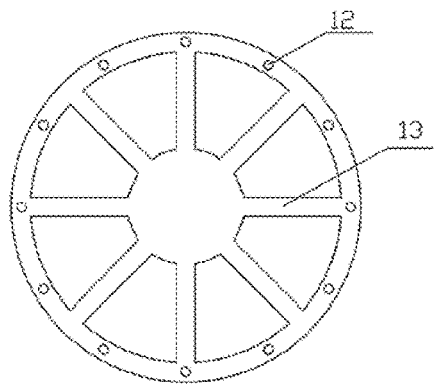
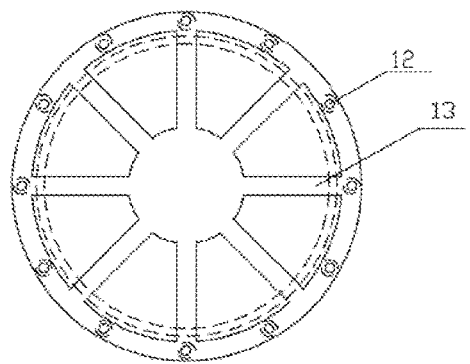
Fig.6-3                     Fig.6-4
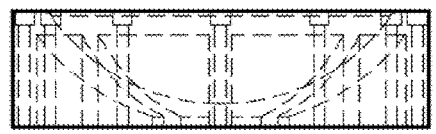
Fig.6-5                     Fig.6-6
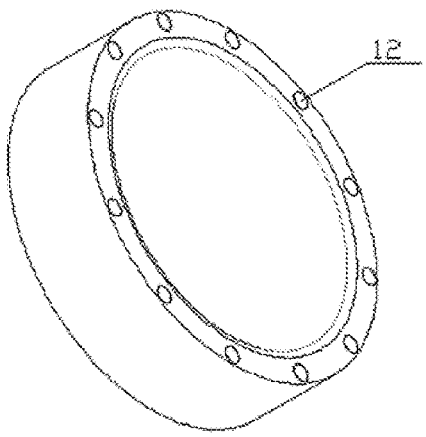
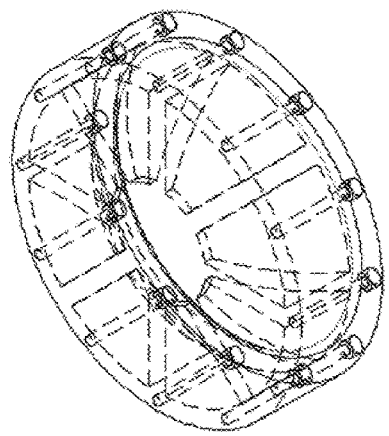
Fig.6-7                     Fig.6-8

QUICKLY-DETACHABLE AIRBAG-TYPE FLOATING BREAKWATER

CROSS-REFERENCE TO RELATED APPLICATION

This application claims the priority benefit of China application serial no. 201810776832.0, filed on Jul. 16, 2018. The entirety of the above-mentioned patent application is hereby incorporated by reference herein and made a part of this specification.

BACKGROUND

Technical Field

The present invention relates to a breakwater, particularly relates to a quickly-detachable airbag-type floating breakwater, and belongs to the field of breakwaters.

Background Art

A breakwater system is one of important technical measures for guaranteeing offshore and ocean platform safety operations. For ocean structures, a breakwater can be protected by attenuating wave energy in a manner of reflecting wave, destroying wave water particle motion, performing resonance or the like, so as to provide a relatively steady ocean environment for the ocean structures, thereby improving the working efficiency and safety thereof, and reducing the economic loss. For offshore engineering such as ports, breakwaters are used not only for stabilizing a water area, but also for reducing sediment accumulation in the ports.

The breakwaters are divided into a fixed breakwater and a floating breakwater. Compared with the conventional fixed breakwater, the floating breakwater has many advantages as follows: (1) since the floating breakwater floats on water generally, seawater flowing cannot be affected, so that the exchange capacity of the seawater is strong, and therefore seawater pollution can be prevented, thereby avoiding influence on the ocean environment; (2) the cost of the floating breakwater is lower than that of the conventional fixed breakwater, the floating breakwater can better adapt to different working water depths and cannot affect the normal working thereof, and the construction cost cannot be sharply increased with the increase of water depths; (3) the floating breakwater can be applied to various geological conditions without being affected by terrain; (4) when a breakwater system with an earth-stone base is constructed, raw materials must face the problems of long-distance sea transportation, high cost, long construction cycle, complex environment and the like, but if the floating breakwater is adopted, these problems can be effectively avoided; (5) the floating breakwater is short in construction cycle, high in speed and convenient to install and remove, and compared with the fixed breakwater, the floating breakwater is convenient for post-maintenance, and low in cost; and (6) it can be adaptive to the cases of large water depth, soft foundation, spring tide range, and water exchange introduction for improving water quality in the ports.

However, most of the existing floating breakwaters are used for temporary construction coverage, there is a lack of breakwater systems designed for heavy storm waves, and the current floating breakwater connecting structure is complex in design, complicated in installation, very time-consuming, and high in post-maintenance cost.

SUMMARY OF THE INVENTION

Purpose of the Invention: The present invention is directed to providing an airbag-type floating breakwater, which is capable of effectively resisting against wave, reducing the material use, reducing the construction cost, and realizing quick installation and removal.

Technical Solution: A quickly-detachable airbag-type floating breakwater of the present invention includes a plurality of water wave absorbing structure units arranged along a length direction of the breakwater, the adjacent water wave absorbing structure units being connected by a connecting unit, wherein the water wave absorbing structure unit comprises at least two floats arranged side by side and a wave absorbing plate located on the floats, and the connecting unit comprises bases located at the ends of the floats, an airbag located between the adjacent bases, and a steel chain for connecting the adjacent water wave absorbing units, and the adjacent bases wrapping the airbag to form a buffer connecting structure.

Preferably, the float is cylindrical. Furthermore, the float can also be in other forms such as square or rectangle.

Preferably, the base is bowl-shaped, and the airbag is spherical. Further, the bowl back of the base can be provided with a plurality of reinforcing arms. Furthermore, the bowl rim of the base is provided with a plurality of stepped holes.

In the present invention, the floats are arranged side by side along a horizontal direction to form a single-layer water wave absorbing structure unit, and a wave absorbing plate is located on the surfaces of the adjacent floats. Further, the single-layer water wave absorbing structure units are arranged in a vertical direction to form a double-layer or multi-layer water wave absorbing structure unit. Furthermore, the adjacent floats are connected by a truss.

In the present invention, the adjacent bases in the connecting unit are locked by a nut and a bolt.

In addition, mooring systems are symmetrically disposed on both sides of the water wave absorbing structure unit.

Beneficial Effect: Compared with the prior art, the present invention has the following significant advantages: (1) adjacent water wave absorbing structure units can be quickly and conveniently assembled by a connecting unit, thereby simplifying the difficulty in a breakwater building and construction installation process, improving the post-maintenance convenience of the breakwater, and reducing the post-maintenance cost; (2) the connecting unit adopting the buffer connecting structure formed by wrapping the airbag with the bases can effectively alleviate movement, extrusion and torsion between adjacent breakwaters, and furthermore, since it is unnecessary to separate the adjacent breakwaters by using related engineering ships during airbag replacement, the post-maintenance cost is reduced; (3) a steel chain is additionally disposed in the connecting unit to serve as a limiting device for the adjacent breakwaters, so that various displacements of the breakwater are effectively limited, and furthermore, the combination of the steel chain and the airbag can avoid excessive motion between the breakwaters under the action of wave, the adjacent floating breakwaters can be better connected into a whole, and wave energy is better attenuated; and (4) the provision of the mooring system can ensure the safety operation of the floating breakwater under the action of wave, and the floating breakwater can also operate normally in a water area where piling is inconvenient.

BRIEF DESCRIPTION OF THE DRAWINGS

FIG. 5-1 (a) is a sectional location of a water wave absorbing structure unit according to the present invention.

FIG. 5-1 (b) is a sectional view 1 of a water wave absorbing structure unit according to the present invention.

FIG. 5-2 (a) is a sectional location of a water wave absorbing structure unit according to the present invention.

FIG. 5-2 (b) is a sectional view 2 of a water wave absorbing structure unit according to the present invention.

FIG. 6-1 and FIG. 6-2 are a top view and a perspective view of a bowl-shaped base according to the present invention respectively.

FIG. 6-3 and FIG. 6-4 are a bottom view and a perspective view of a bowl-shaped base according to the present invention respectively.

FIG. 6-5 and FIG. 6-6 are a side view and a perspective view of a bowl-shaped base according to the present invention respectively.

FIG. 6-7 and FIG. 6-8 are an isometric diagram and a perspective view of a front surface of a bowl-shaped base according to the present invention respectively.

FIG. 6-9 and FIG. 6-10 are an isometric diagram and a perspective view of a back surface of a bowl-shaped base according to the present invention respectively.

FIG. 7-1 and FIG. 7-2 are a front view and a perspective view of a steel chain according to the present invention respectively.

FIG. 7-3 and FIG. 7-4 are a side view and a perspective view of a steel chain according to the present invention respectively.

FIG. 7-5 and FIG. 7-6 are an isometric diagram and a perspective view of a steel chain according to the present invention respectively.

FIG. 8 is a schematic diagram depicting collaboration of a steel chain fixing device and a steel chain according to the present invention.

FIG. 9-1 is a top view of a spherical airbag according to the present invention.

FIG. 9-2 is a sectional view of a spherical airbag according to the present invention.

FIG. 9-3 is a schematic diagram depicting collaboration of a bowl-shaped base and an airbag according to the present invention.

FIG. 10-1 is a front view of a mooring system according to the present invention.

FIG. 10-2 is a side view of a mooring system according to the present invention.

FIG. 10-3 is a top view of a mooring system according to the present invention.

FIG. 11-1 is a partial enlarged view of the present invention.

FIG. 11-2 is an assembly diagram of FIG. 11-1.

FIG. 11-3 is a partial enlarged view of a top view of the present invention.

FIG. 11-4 is a partial enlarged view of a water wave absorbing structure unit and a connecting unit according to the present invention.

DETAILED DESCRIPTION OF THE EMBODIMENTS

The technical solution of the present invention is further described hereinafter with reference to the accompanying drawings.

Figure 1:
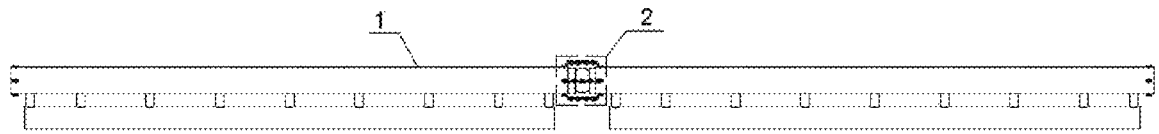
FIG. 1 is a front view of a floating breakwater according to the present invention.
Figure 2:
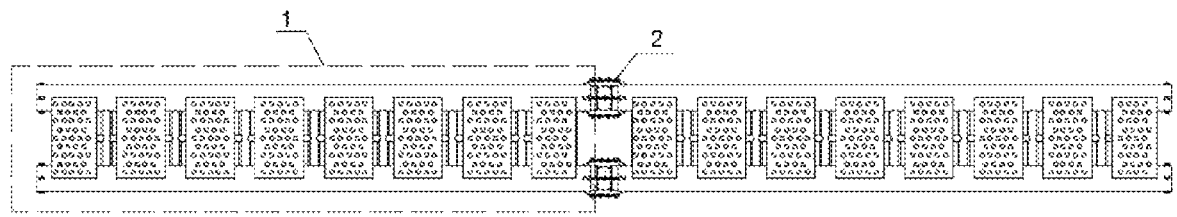
FIG. 2 is a top view of a floating breakwater according to the present invention.
Figure 4:
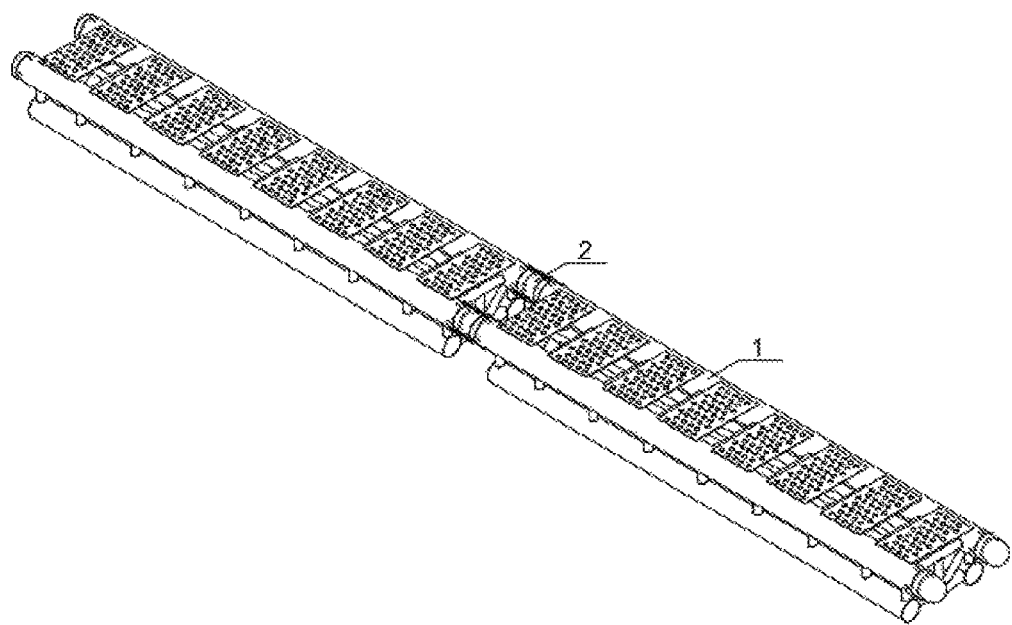
FIG. 4 is an isometric diagram of a floating breakwater according to the present invention.

As shown in FIGS. 1, 2 and 4, an airbag-type floating breakwater of the present invention includes a plurality of water wave absorbing structure units 1 arranged along a length direction of the breakwater. The adjacent water wave absorbing structure units 1 are connected by a connecting unit 2. Mooring systems 3 can be symmetrically disposed on both sides of the water wave absorbing structure unit 1. The water wave absorbing structure units 1 can be integrated by the elastic connection of the connecting unit 2 and the limiting action with the mooring systems 3, so as to perform overall motion in wave to resist against the wave, as shown in FIG. 10-2.

The water wave absorbing structure unit 1 includes at least two floats arranged side by side and a wave absorbing plate 4-2 located on the floats, and the connecting unit 2 includes bases located at the ends of the floats, an airbag located between the adjacent bases, and a steel chain for connecting the adjacent water wave absorbing units, the adjacent bases wrapping the airbag to form a buffer connecting structure.

Figure 12:
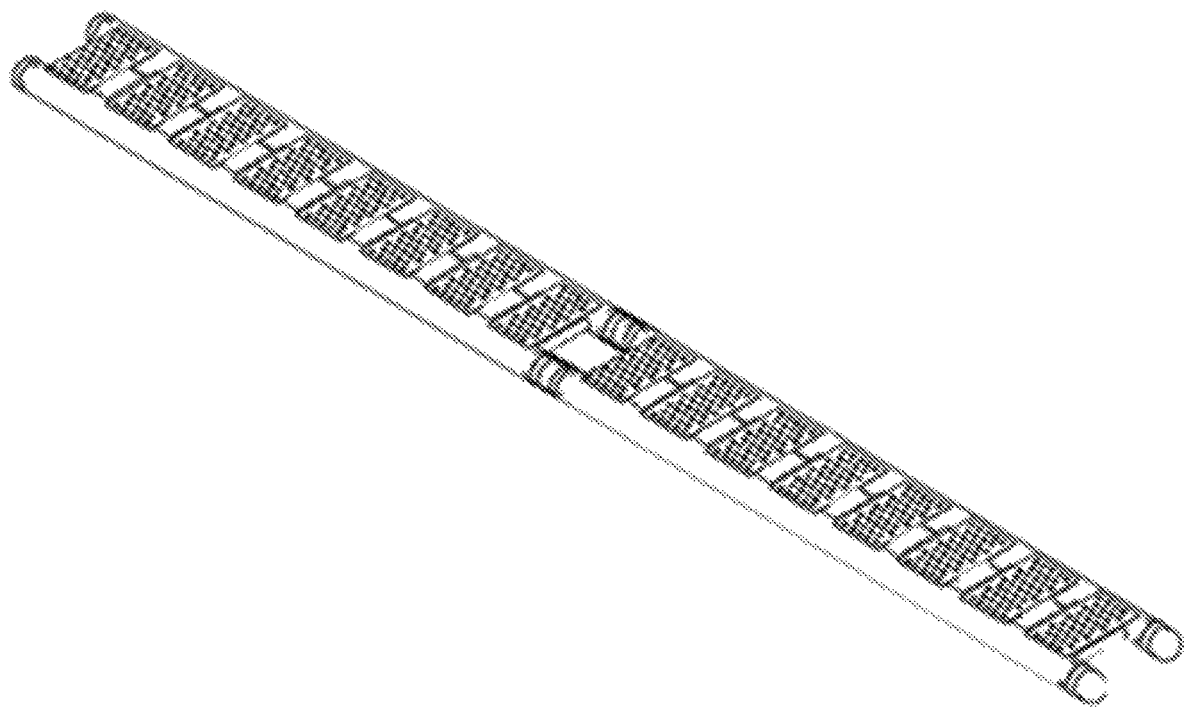
FIG. 12 is an isometric diagram of a single-layer water wave absorbing structure unit according to the present invention.

In the present invention, the floats are arranged side by side along a horizontal direction to form a single-layer water wave absorbing structure unit (shown in FIG. 12), and the wave absorbing plate is located on the surfaces of the adjacent floats; and the single-layer water wave absorbing structure units are arranged in a vertical direction to form a double-layer or multi-layer water wave absorbing structure unit (shown in FIG. 4).

Figure 3:
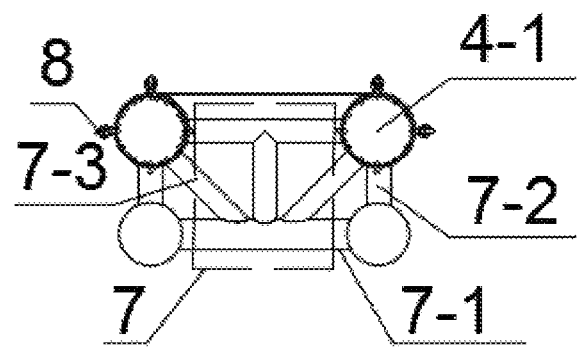
FIG. 3 is a side view of a floating breakwater according to the present invention.
Figures 1, 5:
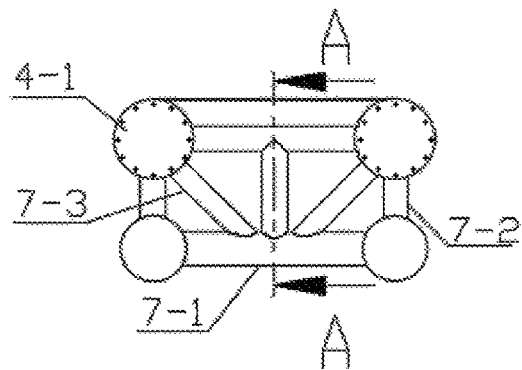
Figures 1, 5:
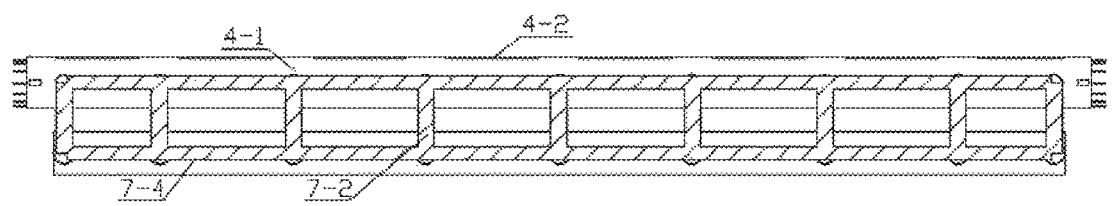

In a specific implementation, as shown in FIG. 3, FIG. 5-1 (a), FIG. 5-1 (b), FIG. 5-2 (a), and FIG. 5-2 (b), the water wave absorbing structure unit 1 includes a water wave absorbing structure unit main body 4, a steel chain fixing device 5 and a threaded rod 6, wherein the water wave absorbing structure unit main body 4 includes four cylindrical floats 4-1, a plurality of wave absorbing plates 4-2 and a truss structure 7, the axes of the four cylindrical floats are located at four vertex angles of a rectangle respectively, two of the cylindrical floats 4-1 are located at two upper vertex angles of the rectangle, the other two cylindrical floats 4-1 are located at two lower vertex angles of the rectangle, and the four cylindrical floats are connected by the truss structure 7; the truss structure 7 includes a plurality of cross braces 7-1, vertical braces 7-2, diagonal braces 7-3 and longitudinal braces 7-4; every twelve threaded rods 6 compose a group and are disposed in a circular array on two end surfaces of the two cylindrical floats 4-1 arranged side by side, except the head and tail ends of the first and last water wave absorbing structure units; one end of the threaded rod 6 is fixed, in a welding form, onto two end surfaces of the two cylindrical floats 4-1 arranged side by side; and every four steel chain fixing devices 5 compose a group, disposed in a circular array at two ends of cylinder walls of the two cylindrical floats 4-1 arranged side by side. A plurality of wave absorbing plates 4-2 is linearly and uniformly distributed above the water wave absorbing structure unit 1 along the length direction of the breakwater, and a plurality of circular holes are uniformly distributed on the wave absorbing plate 4-2.

Figures 6, 7, 8, 9:
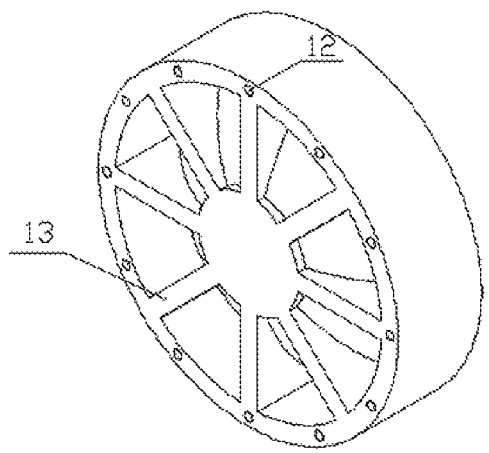
Figures 6, 7, 8, 9, 10:
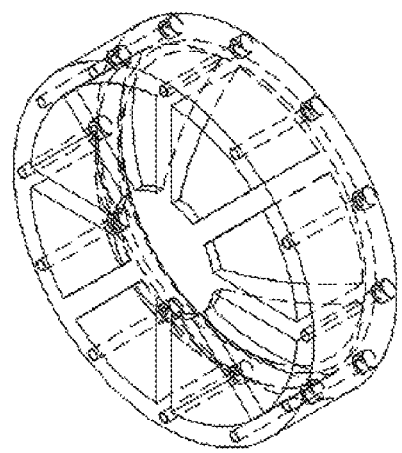
Figures 1, 7:
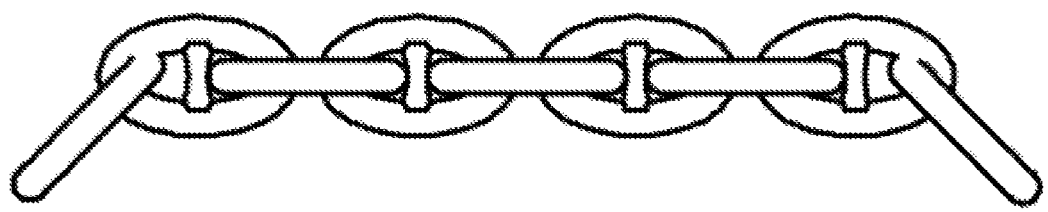
Figures 2, 7:
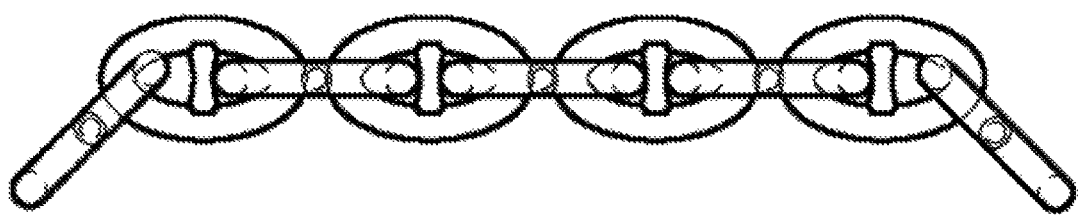
Figures 3, 4, 7:
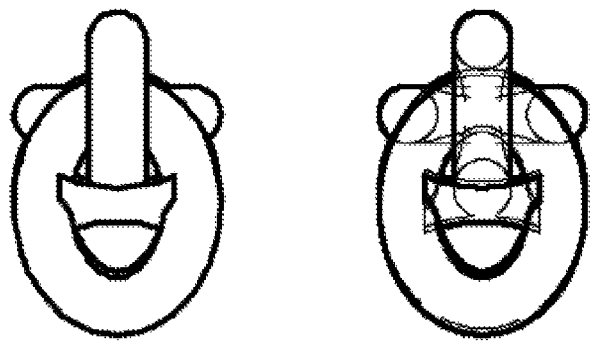
Figures 5, 6, 7:
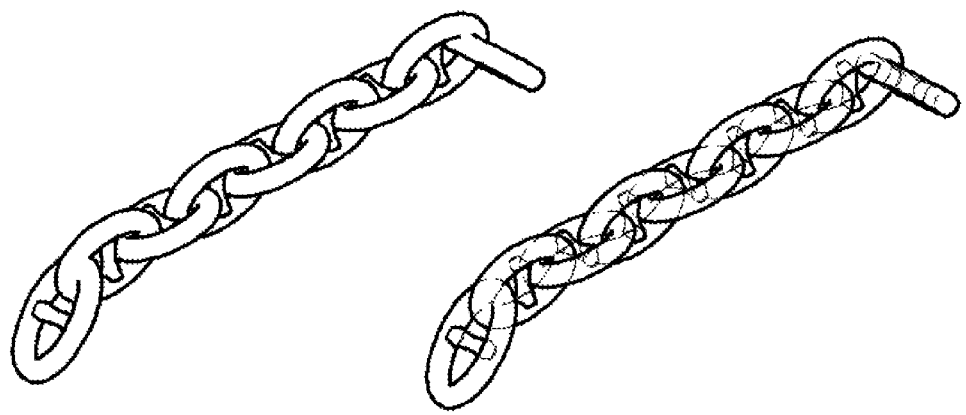
Figure 8:
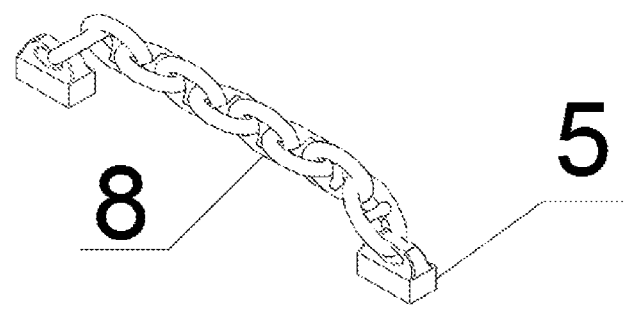
Figures 1, 9:
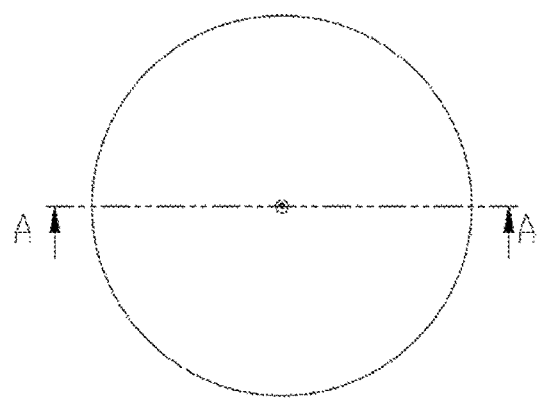
Figures 2, 9:
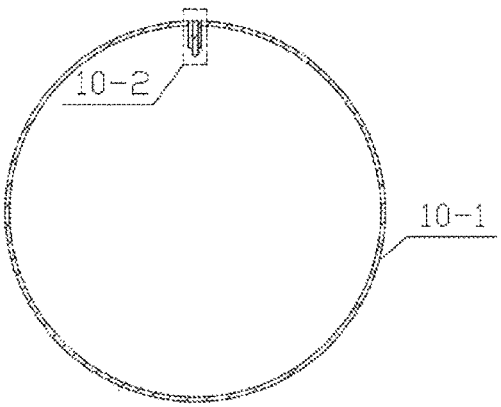
Figures 3, 9:
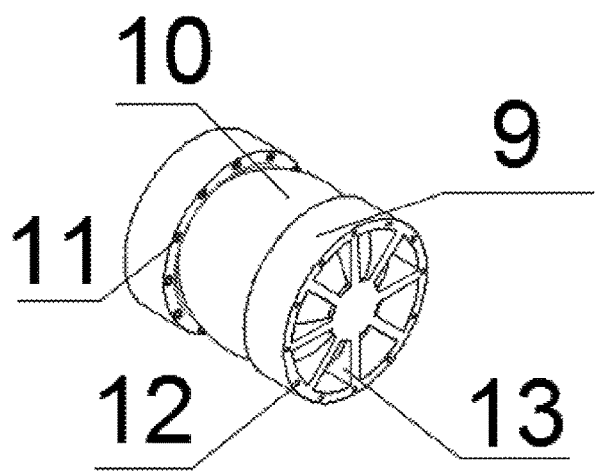
Figures 1, 10:
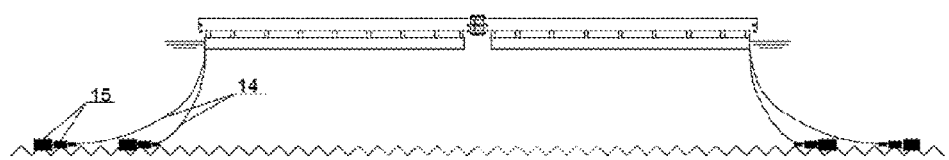
Figures 2, 10:
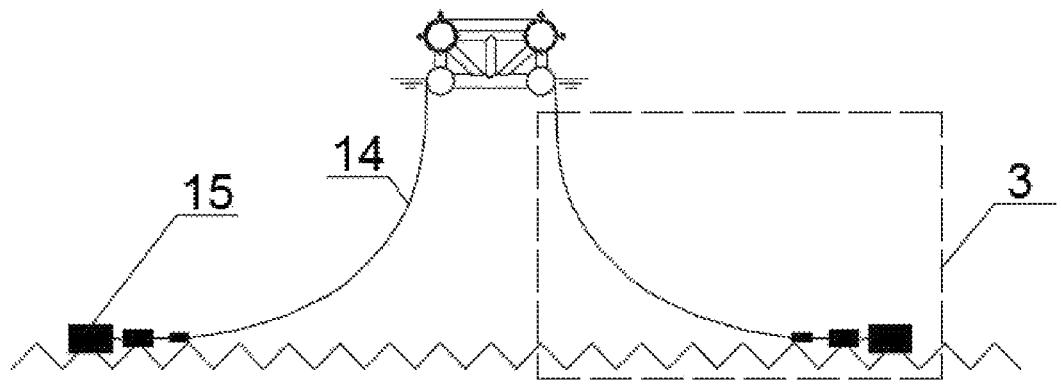
Figures 3, 10:
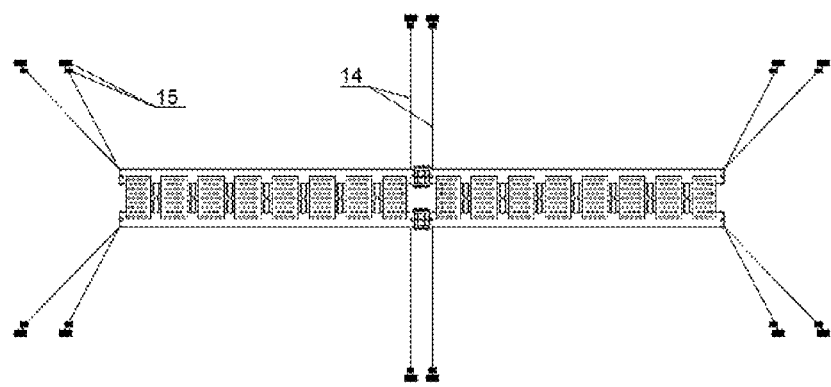
Figures 1, 11:
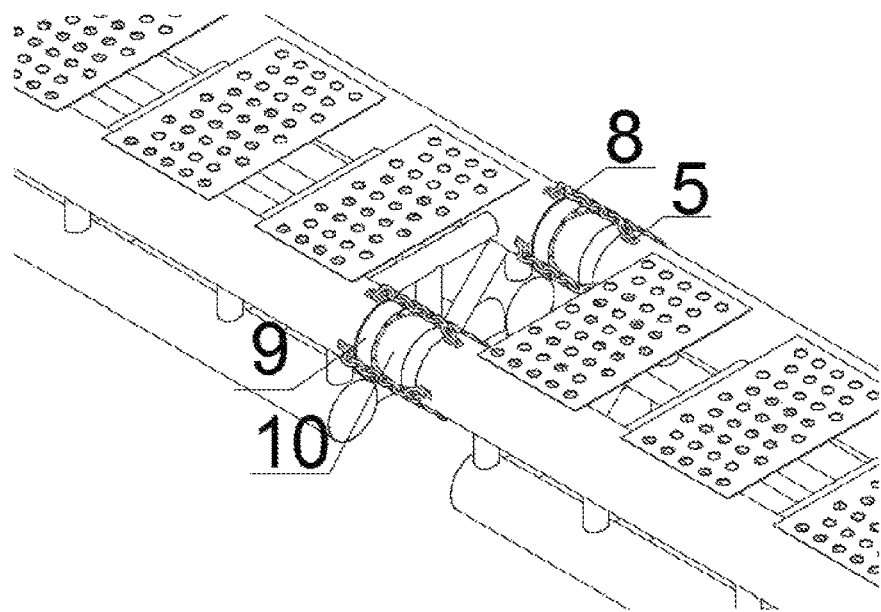
Figures 2, 11:
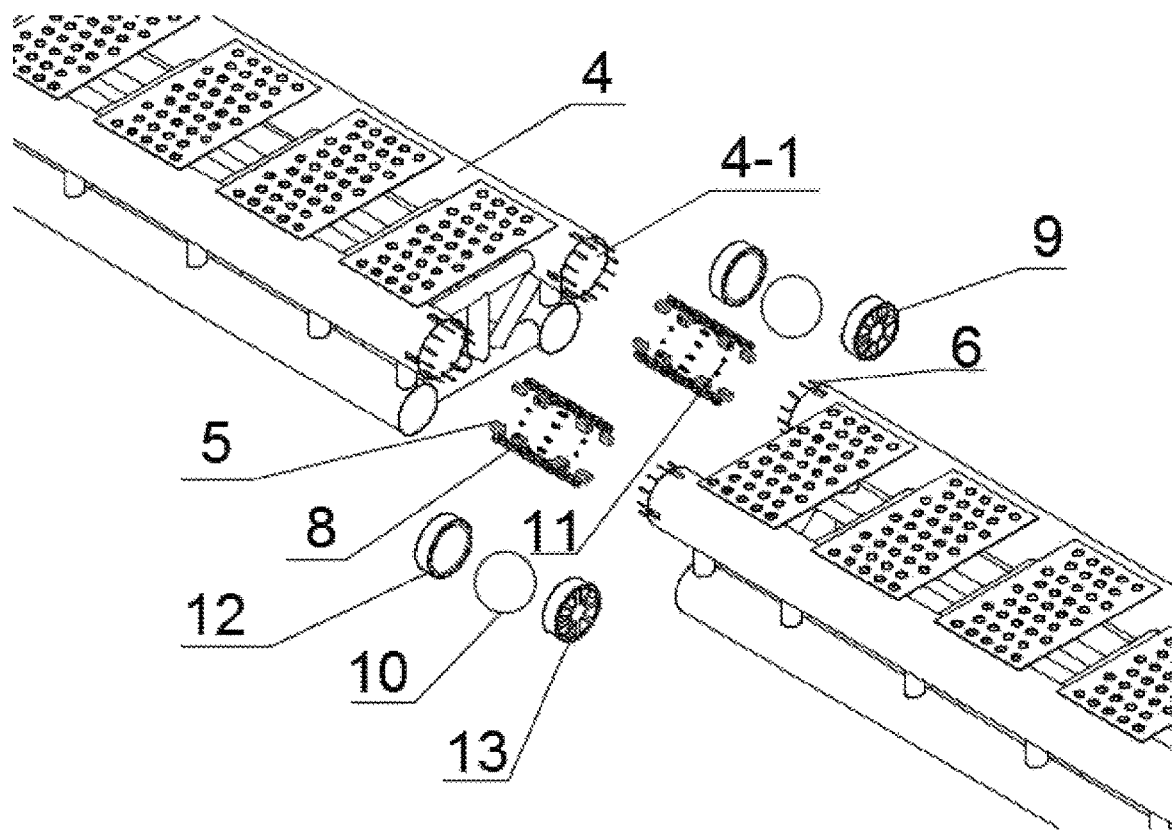
Figures 3, 11:
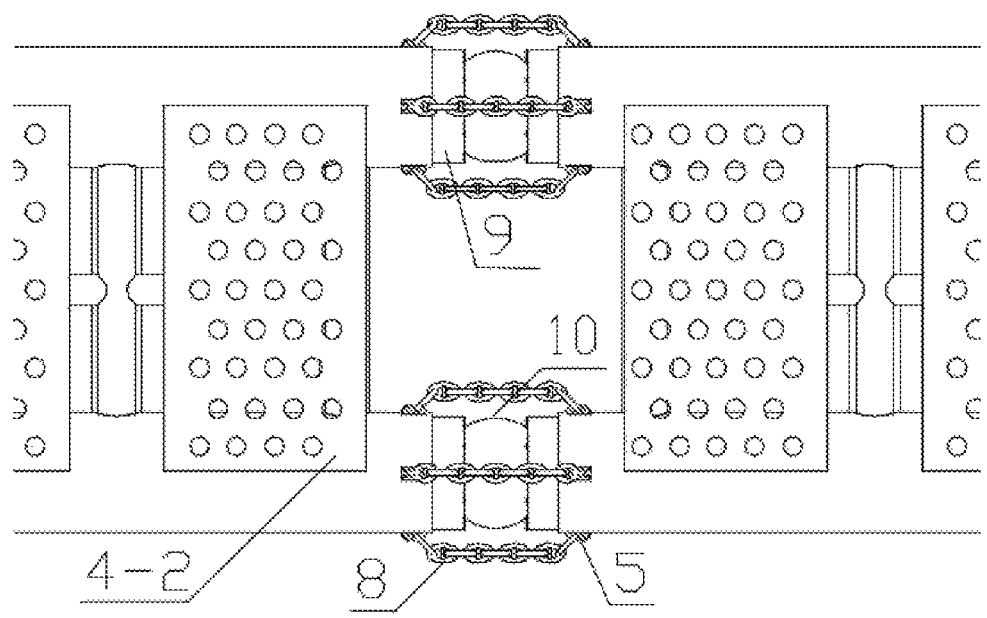
Figures 4, 11:
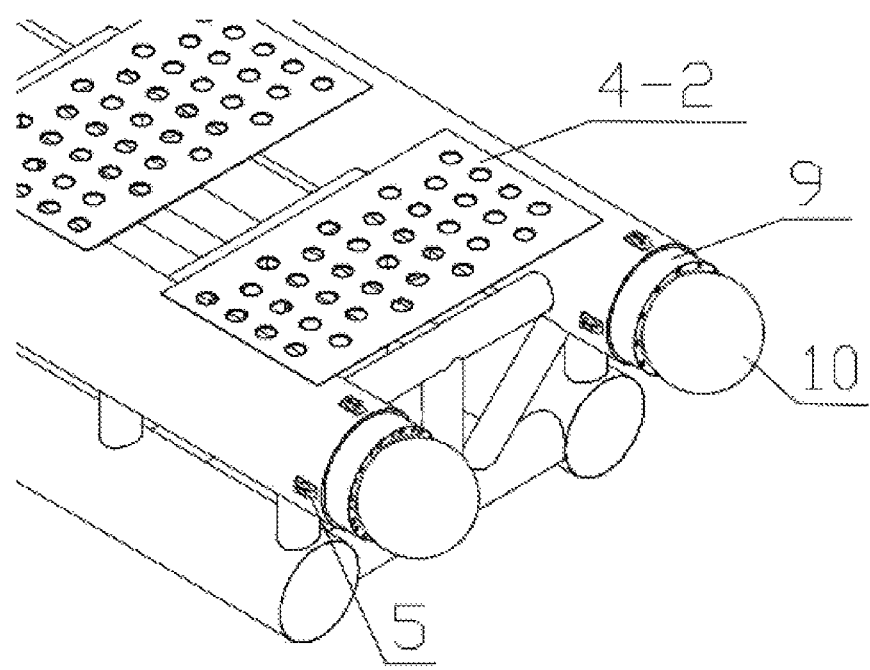

In a specific implementation, as shown in FIG. 6-1 and FIG. 6-2, FIG. 6-3 and FIG. 6-4, FIG. 6-5 and FIG. 6-6, FIG. 6-7 and FIG. 6-8, FIG. 6-9 and FIG. 6-10, FIG. 11-1, FIG. 11-2, FIG. 11-3 and FIG. 11-4, the connecting unit 2 includes a steel chain 8, a bowl-shaped base 9, a spherical airbag 10 and a bolt 11, wherein the bowl-shaped base 9 preferably is a bowl-shaped rubber buffer base, fixed onto two end surfaces of the two cylindrical floats 4-1 arranged side by side by means of the fastening action of the threaded rod 6 and the bolt 11. Twelve through-type stepped holes 12 in circular array are provided on the bowl rim of the bowl-shaped rubber buffer base, and are used for cooperating with the fastening action of the threaded rod 6 and the bolt 11. Eight reinforcing arms 13 in circular array are disposed on the bowl back of the bowl-shaped rubber buffer base, and the eight reinforcing arms 13 are crossed in the center of a circle. The bowl rim of the bowl-shaped rubber buffer base is provided with a round edge. The bowl-shaped rubber buffer base can adopt a shell design and can be made of natural rubber. As shown in FIG. 9-1 and FIG. 9-2, the airbag 10 includes a spherical airbag 10-1 and an air charging device 10-2, wherein the spherical airbag 10-1 is made of natural rubber, is disposed between the adjacent bowl-shaped rubber buffer bases along the length direction of the breakwater, and is wrapped by the two bowl-shaped rubber buffer bases, as shown in FIG. 9-3. The outer surface of the spherical airbag is coated with a polytetrafluoroethylene material and is also provided with a pore structure, and the spherical airbag can resist against mutual extrusion and torsion of the adjacent water wave absorbing structure units in wave. Every four steel chains 8 compose a group, and every two groups serving as one unit are disposed between the adjacent water wave absorbing structure units 1, except the head and tail ends of the first and last water wave absorbing structure units 1. The head and tail ends of the steel chain 8 are connected to the steel chain fixing devices 5 at two ends of the wall surfaces of two cylindrical floats 4-1, arranged side by side, of the adjacent water wave absorbing structure units 1. Each view about the steel chain 8 is as shown in FIG. 7-1 and FIG. 7-2, FIG. 7-3 and FIG. 7-4, FIG. 7-5 and FIG. 7-6 and FIG. 8.

As shown in FIG. 10-1, FIG. 10-2 and FIG. 10-3, the mooring system 3 includes a mooring chain 14 and a balancing weight 15. One end of the mooring chain 14 is connected with the cylindrical float 4-1, and the other end of the mooring chain 14 is connected with the balancing weight 15. The mooring chains 14 are symmetrically disposed on two sides of the water wave absorbing structure unit 1 to resist against wave in a main wave direction, and ends of the floating breakwater can be additionally provided with mooring chains 14 for resisting against wave in other wave directions. The mooring chain 14 is made of one of a steel chain, a polyester cable or a steel wire rope. The balancing weight 15 is cubic, spherical or cylindrical and is made of metal, cement blocks or stone. A plurality of balancing weights 15 is disposed at the bottom end of the mooring chain 14 in series. A section of the bottom of the mooring chain 14 is flattened and tiled on a seabed under the action of gravity, so that the effect of piling is achieved, the mooring chain 14 is fixed, and a restoring force is provided for the mooring chain 14.

In the present invention, an appropriate number of water wave absorbing structure units can be selected according to the size of a water area need to be protected, the adjacent water wave absorbing structure units are connected by the connecting unit to compose a water wave absorbing device, thereby achieving the purpose of overall wave absorbing, and simplifying the installation steps at the same time. During specific construction, the bowl-shaped rubber buffer base and the water wave absorbing structure unit are assembled on the manufacturing site, and then transported to a target sea area. After each assembled water wave absorbing structure unit arrives at the target seat area, the water wave absorbing structure units are connected by using the steel chain 8. After the connection is completed, the spherical airbag is lifted between the adjacent water wave absorbing structure units and is inflated on the site, and when the internal pressure of the airbag reaches a design value, the water wave absorbing structure units are integrated to achieve the purpose of quick installation. When the spherical airbag is replaced, an airbag to be replaced is deflated to a target pressure, the airbag to be replaced will fall off to the sea under the action of gravity, and then a new airbag is lifted in and is inflated to a design pressure. Since it is unnecessary to separate adjacent breakwaters by using related engineering ships during airbag replacement, the post-maintenance cost is effectively reduced. After the installation is completed, the spherical airbag, serving as a direct buffer device of the adjacent breakwaters, can effectively alleviate movement, extrusion and torsion between the adjacent breakwaters. The steel chain, serving as a limiting device for the adjacent breakwaters, can effectively limit various displacements of the breakwater. The combination of the steel chain and the airbag can avoid excessive motion between the breakwaters under the action of wave, the adjacent floating breakwaters can be better connected into a whole, and wave energy is better attenuated. The design of the mooring system can ensure the safety operation of the floating breakwater under the action of wave, and the floating breakwater can also operate normally in a water area where piling is inconvenient.

What is claimed is:

1. A quickly-detachable airbag-type floating breakwater, comprising a plurality of water wave absorbing structure units arranged along a length direction of the breakwater, wherein the adjacent water wave absorbing structure units are connected by a connecting unit, wherein the water wave absorbing structure unit comprises at least two floats arranged side by side and a wave absorbing plate located on the floats, and the connecting unit comprises bases located at the ends of the floats, an airbag located between adjacent bases, and a steel chain for connecting the adjacent water wave absorbing units, and the adjacent bases wrapping the airbag to form a buffer connecting structure, wherein each of the bases is bowl-shaped, and the airbag is spherical, each of the bases has a first portion away from the airbag and a second portion close to the airbag, a width of the first portion is not less that a width of the second portion, a bowl back of each of the bases is provided with a plurality of reinforcing arms, and the reinforcing arms are crossed in the center of a circle.

2. The breakwater according to claim 1, wherein the floats are cylindrical.

3. The breakwater according to claim 1, wherein a bowl rim of each of the bases is provided with a plurality of stepped holes.

4. The breakwater according to claim 1, wherein each of single-layer water wave absorbing structure units is formed by the floats arranged side by side along a horizontal direction, and the wave absorbing plate is located on surfaces of the adjacent floats.

5. The breakwater according to claim 4, wherein the single-layer water wave absorbing structure units are arranged on the top of each other in a vertical direction to form a double-layer or multi-layer water wave absorbing structure unit.

6. The breakwater according to claim 4, wherein the adjacent floats are connected by a truss.

7. The breakwater according to claim 1, wherein the adjacent bases in the connecting unit are locked by a nut and a bolt.

8. The breakwater according to claim 1, wherein mooring systems are symmetrically disposed on both sides of the water wave absorbing structure unit.

* * * * *